CODE COMMUNICATION SYSTEM

Filed Nov. 6, 1953 5 Sheets-Sheet 1

INVENTOR.
H.S. WYNN
BY
Forest B. Hitchcock
HIS ATTORNEY

CODE COMMUNICATION SYSTEM

Filed Nov. 6, 1953 5 Sheets-Sheet 2

INVENTOR.
H.S. WYNN
BY
Forest B. Hitchcock
HIS ATTORNEY

CODE COMMUNICATION SYSTEM

Filed Nov. 6, 1953

5 Sheets-Sheet 3

INVENTOR.
H. S. WYNN
BY
Forest B. Hitchcock
HIS ATTORNEY

INVENTOR.
H.S.WYNN
BY
Forest B. Hitchcock
HIS ATTORNEY

INVENTOR.
H.S.WYNN
BY
Forest B. Hitchcock
HIS ATTORNEY

United States Patent Office 2,793,357

Patented May 21, 1957

2,793,357

CODE COMMUNICATION SYSTEM

Harold S. Wynn, Pittsford, N. Y., assignor to General Railway Signal Company, Rochester, N. Y.

Application November 6, 1953, Serial No. 390,590

23 Claims. (Cl. 340—163)

Figure 1A:
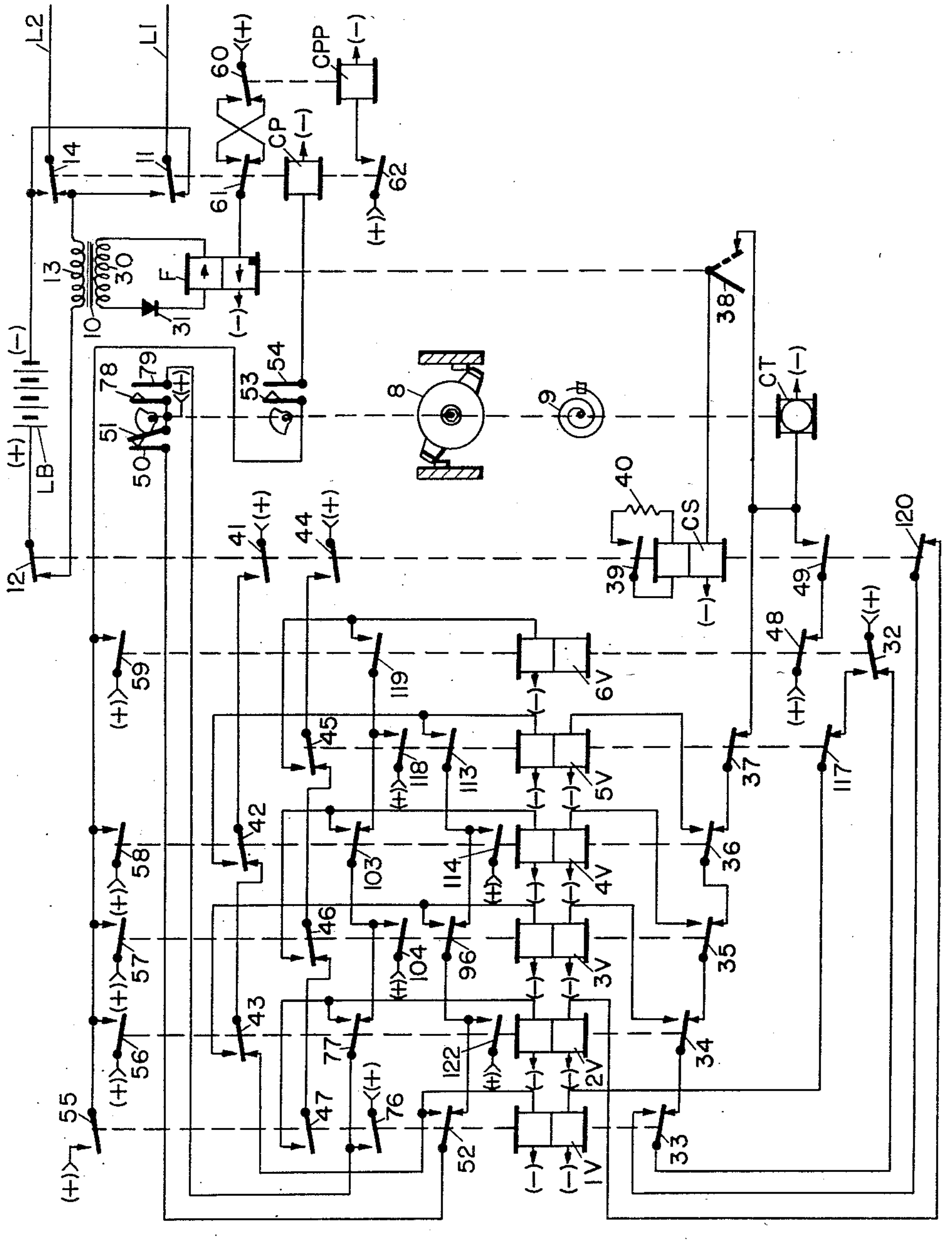

This invention relates to code communication systems, and it more particularly pertains to systems for the communication of indications to a control office of conditions of devices at a plurality of spaced field stations.

For the selective communication to a control office over a pair of line wires of indications of the conditions of devices located at different spaced field stations, it is generally necessary to provide stepping means at each of the field stations as well as the control office in order to set up distinctive channels for the communication of the indications from the different field stations.

The system according to the present invention requires stepping apparatus only at the control office, and the line circuit is so organized that the indications are transmitted in succession, one indication from each station, during a cycle of operation, the indications being transmitted during a cycle from the stations taken in order geographically with respect to the control office. The line circuit is normally intact, with a line relay maintained energized at each field station. A cycle of operation is initiated by a field station momentarily shunting the line circuit. In response to the removal of this shunt, the control office opens the line circuit to condition the system for the transmission of indications.

When the line circuit is opened, the line relays all drop away, and in accordance therewith, the line circuit is broken up by being opened at each field station. The line circuit is then pulsed by a pole changer at the control office with pulses of alternate polarity to effectively cause the line circuit to be put back together, one section (taken geographically from a control office out to the most distant field station) for each pulse. Each time a section of the line circuit is added, an indication is transmitted from the station making the last connection in the line circuit. The building up of the line circuit progressing one step at a time because of the use during a cycle of biased polar line relays which are poled alternately in their connection to the line circuit. By this organization, each time the line circuit is extended, the polarity of energization feeding through the extended portion of the line circuit is of the wrong polarity to actuate the biased polar line relay at the next field station, and thus the propagation of the line circuit is arrested until the next pulse of the opposite polarity is transmitted.

Impulse detection at the control office is made to respond to only a decrease in current in the line circuit as by the removal of shunts. Thus, the increase in current by the adding of line relays to the line circuit as the circuit is built up does not actuate the line relay at the control office, as this line relay is actuated by the line circuit only by a decrease in line circuit. It is reset by a local energizing circuit.

An object of the present invention is to indicate at a control office the condition of devices at different remotely spaced field stations over a single line circuit by use of a minimum amount of communication apparatus.

Another object of the present invention is to transmit indications to a control office from different field stations, one field station at a time, by first breaking up the line circuit, and then putting it together geographically from the control office in successive steps, with the communication of an indication from a different field station during each step.

Another object of the present invention is to initiate an indication cycle of operation from a state of rest by momentarily shunting the line circuit at a field station and thereafter breaking up the line circuit and putting it back together step by step as the cycle of operation progresses.

Another object of the present invention is to control the propagation of stepping in putting the line circuit together by the use of biased polar relays at the field stations which are polarized oppositely in their connection to the line circuit as compared to the connection of the corresponding relay at the next adjoining field station.

Another object of the present invention is to transmit indications from the field stations only upon the removal of a shunt from the line circuit.

Another object of the present invention is to store an indication start in a code communication system of the character described while the cycle of operation is in progress.

Other objects, purposes, and characteristic features of the present invention will be in part obvious from the accompanying drawings, and in part pointed out as the description of the invention progresses.

Figure 1B:
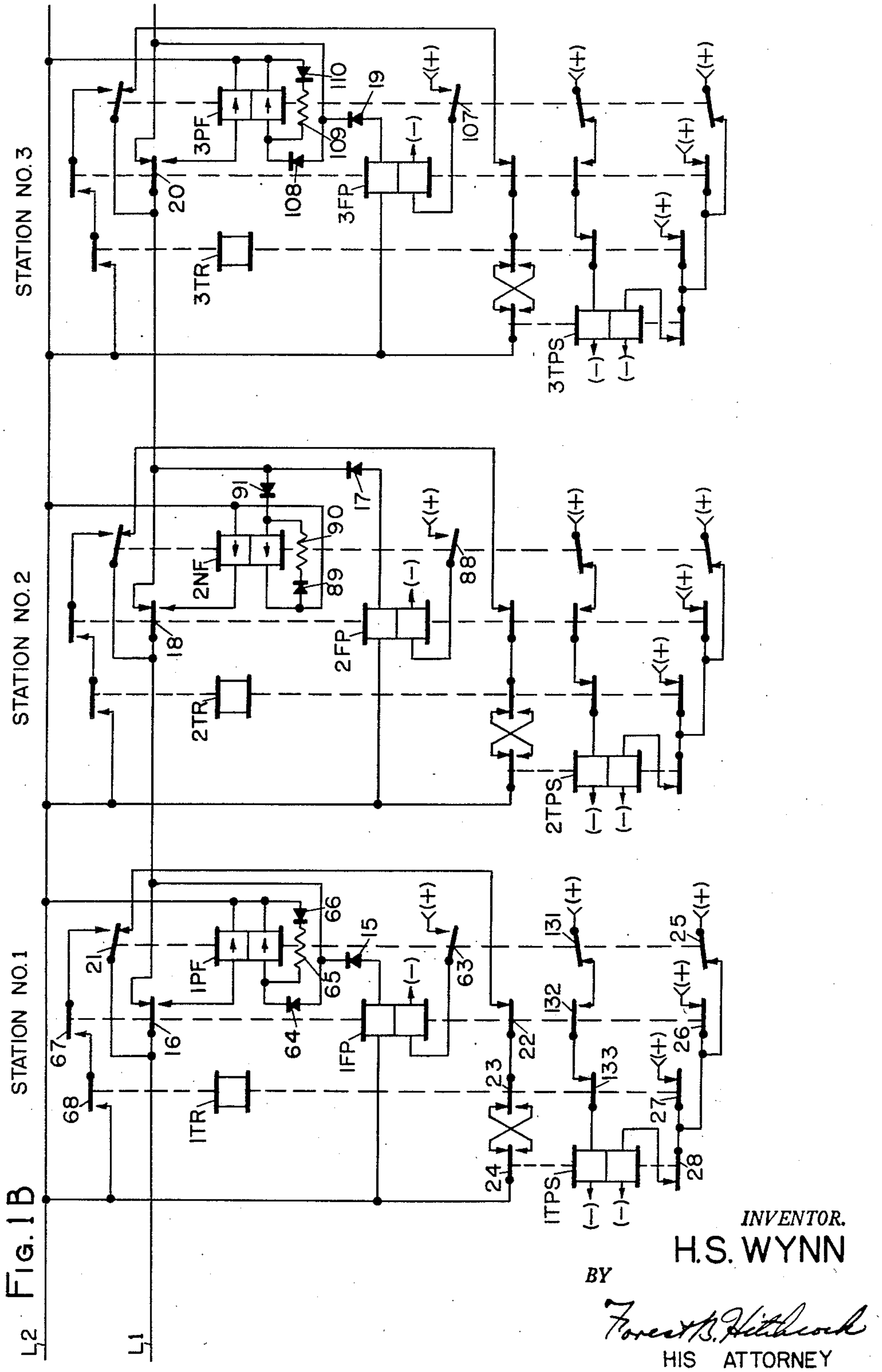
Figure 2:
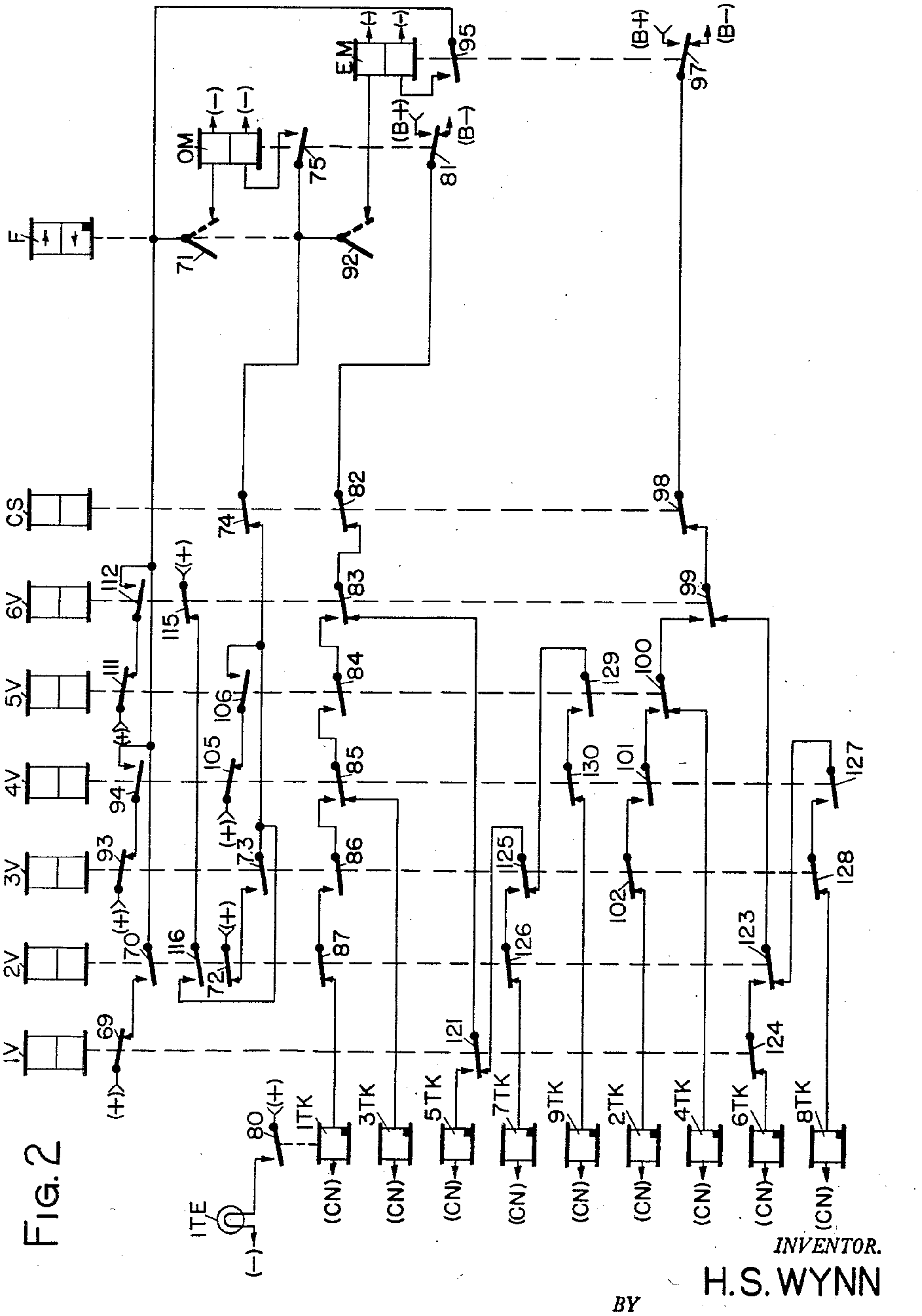
Figure 3A:
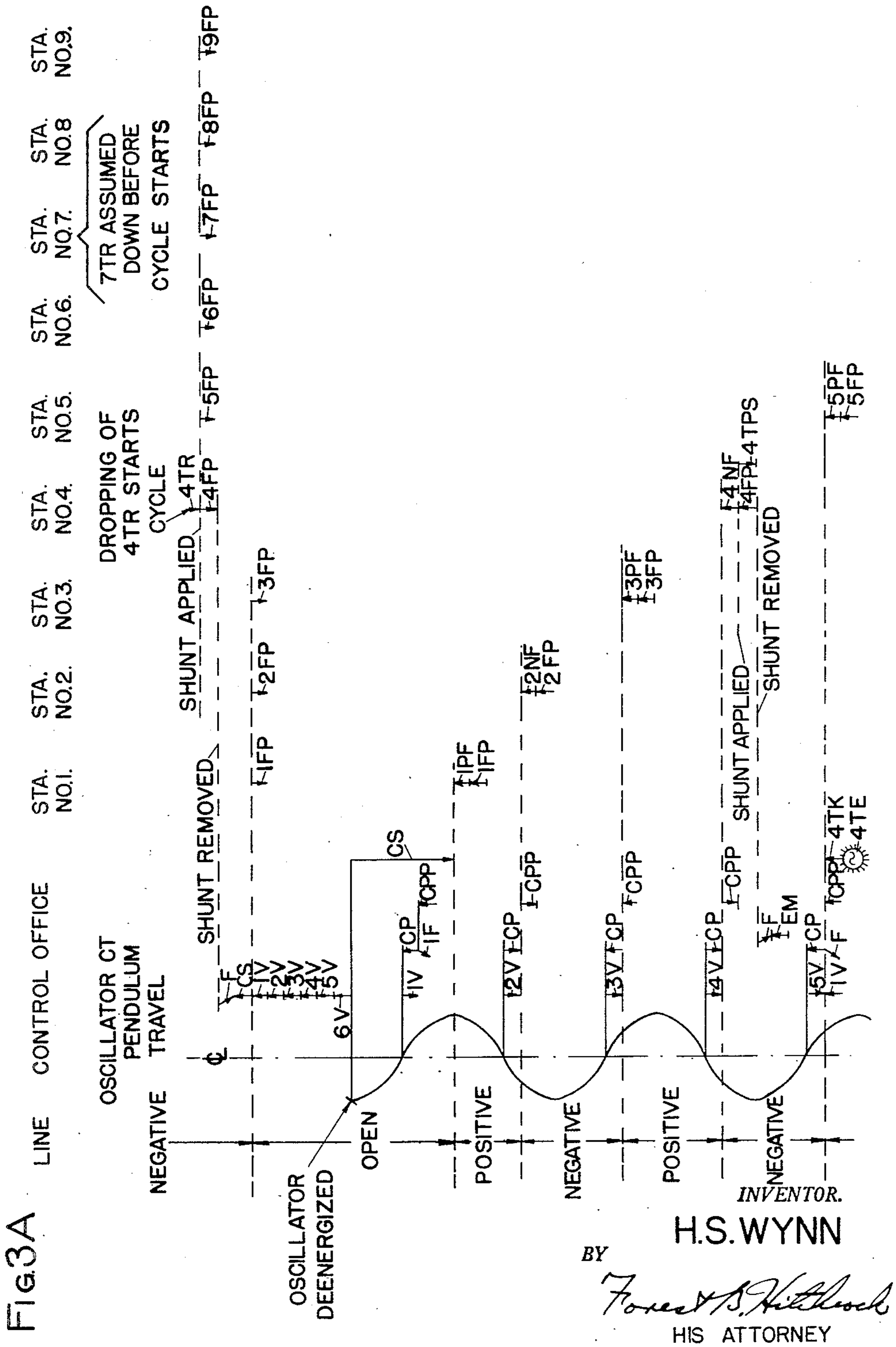
Figure 3B:
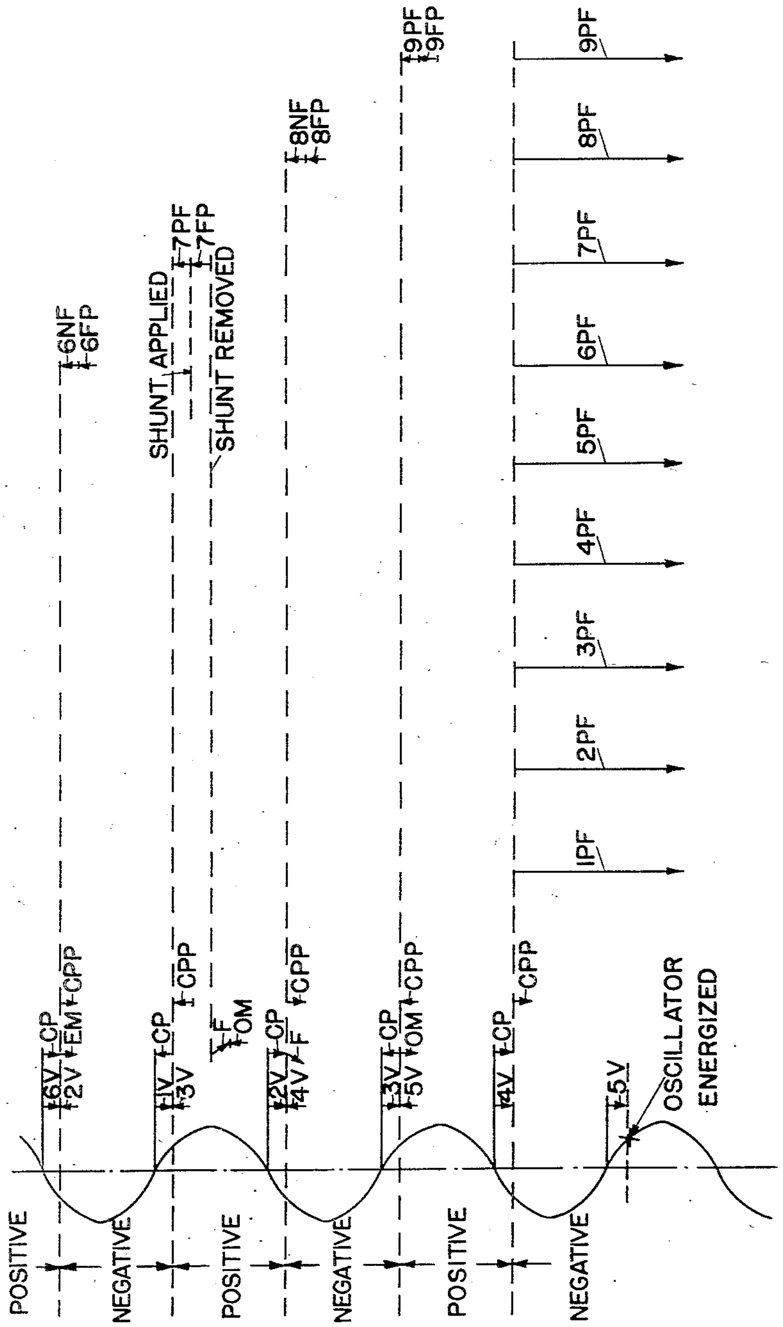

In describing the invention in detail, reference is made to the accompanying drawings in which corresponding parts are designated by like reference characters, in which similar parts having similar functions are designated by like reference characters generally having preceding numerals indicative of the order of relay operations, and in which:

Figs. 1A and 1B when placed side by side illustrate a code communication organization provided according to the present invention for communicating indications from different field stations to a control office;

Fig. 2 illustrates a circuit organization at the control office for the registration of indications received over the line circuit from the different field stations; and Figs. 3A and 3B when placed one above the other constitute a sequence chart illustrating the sequence and relative timing of operations during a typical cycle of operation of the communication system.

For the purpose of simplifying the illustrations and facilitating in the explanation thereof, the various parts and circuits constituting this embodiment of the present invention have been shown diagrammatically in an arrangement to more particularly facilitate an understanding of the mode of operation of the system and the principles involved, rather than to attempt to point out all of the necessary details of construction and the specific arrangement of components that may be provided by those skilled in the art in accordance with the requirements of practice. The symbols (+) and (−) have been used to indicate connections to the positive and negative terminals respectively of suitable batteries or other sources of direct current, and the symbols (B+) and (B−) have been used to indicate connections to the respective positive and negative terminals of a suitable split battery or other source of direct current having a center tap designated as (CN).

In the description of the present invention, the system is normally considered "at rest" when it is not in operation for the communication of indications. The system when operating is considered to operate through a "cycle of operation" when it progresses through the different steps to communicate indications from the different field stations. The indications transmitted from the field stations to the control office are transmitted by selected "shunt" and "non-shunt" characters which are created by selectively shunting the line circuit at selected intervals during the different steps.

Although the present invention is illustrated as being applied to the communication of track occupancy indications from different field stations to a control office, it is to be understood that indications of the conditions of other devices could as well be communicated in accordance with the requirements of practice.

A stepping relay bank is provided at the control office comprising the relays 1V, 2V, 3V, 4V, 5V and 6V. A relay CS is provided for use in initiating a cycle of operation, and an oscillator CT having a pendulum 8 and a torsional spring 9 is provided for governing the rate of stepping. The oscillator CT may have a structure as shown, for example, in the U. S. Patent No. 2,626,382, granted January 20, 1953, to Nelson B. Coley.

A single line circuit is provided connecting the control office and the field stations which is energized by a suitable line battery LB at the control office. A two-position polar line relay F of the magnetic stick type is provided at the control office for the reception of indications transmitted from the different field stations, this relay being coupled to the line circuit through a suitable impulse transformer 10 which has its primary winding 13 connected in series with the line battery LB in the line circuit.

A line relay FP is provided at each of the field stations having two separate windings, one of which is subject to energization locally and the other of which is connected across the line circuit. Each of the field stations also has a biased polar line relay PF or NF which is subject to actuation only by one polarity of energization and is spring biased to a normal position. The structure for a relay of this general character is disclosed, for example, in the U. S. Patent No. 2,617,846, granted November 11, 1952, to O. S. Field. The line relays FP may be of this same structure, but it is not required that they be polarized relays.

Relays TR are provided at the different field stations as being representative of devices to have their positions indicated at the control office. In railway signalling practice, these relays are governed by respective track circuits (not shown) and are normally maintained energized, subject to being shunted by the presence of a train in the associated track circuits. Associated with each relay TR is a track repeater relay TPS which is provided for the purpose of causing the initiation of an indication cycle in accordance with a change in the condition of the associated track relay TR.

At the control office, a pole changer relay CP and an associated repeater relay CPP is provided for the purpose of governing the polarity of energization of the line wires L1 and L2 which extend to the field station from the control office, and for resetting the line relay F.

Relays EM and OM are provided at the control office for the reception of indication codes, and track indication relays TK of the magnetic stick type are provided for the different devices to be indicated at the control office, these relays being selectively controlled in accordance with indication codes received as determined by the control of the relays EM and EO during the different steps of a cycle of operation.

Suitable visual indication means is provided associated with the track indication relays TK such as the lamp 1TE, for example, which is associated with the relay 1TK for indicating the condition of occupancy of a track section (not shown) governing the energization of the track relay 1TR at field station No. 1.

Having thus considered the general organization of the system, more specific consideration will now be given as to the circuit organization when considering typical operating conditions of the system.

*Operation*

When the system is at rest, the line circuit is energized with negative polarity. For the purpose of facilitating in the description of the invention, the line circuit will be considered as energized with positive or negative polarity in accordance with the particular positive or negative terminal of the line battery LB that is connected to the line wire L1. Thus the line circuit is normally energized with negative polarity in accordance with the connection of the negative terminal of the line battery LB through back contact 11 of relay CP to line wire L1. The positive terminal of the line battery LB is normally connected to the line wire L2 through back contact 12 of relay CS, primary winding 13 of the impulse transformer 10, and back contact 14 of relay CP.

The line relays FP at the field stations are normally maintained picked up by the energization of stick circuits fed by the line wires L1 and L2. Thus, relay 1FP is energized from line wire L2 through its upper winding, rectifier 15, and front contact 16 of relay 1FP to line wire L1: relay 2FP is energized from line wire L2 through its upper winding, rectifier 17, front contact 18 of relay 2FP and front contact 16 of relay 1FP, to line wire L1; and relay 3FP is energized from line wire L2 through its upper winding, rectifier 19, front contact 20 of relay 3FP, front contact 18 of relay 2FP and front contact 16 of relay 1FP, to the line wire L1.

It will thus be seen from the foregoing line circuit description as to the conditions when the system is at rest that the line relays FP are connected in multiple across the line wires L1 and L2 through their own front contacts and a front contact of the relay FP for each intervening field station between the associated station and the control office.

Whenever there is a change in the condition of a track relay TR at any field station when the system is at rest, because of the track relay TR becoming out of correspondence with its track repeater relay TPS, a shunt is momentarily applied to the line circuit to cause the actuation of the line relay F at the control office upon the removal of the shunt to initiate a cycle of operation for the communication of indications.

If the relay 1TR (see Fig. 1B) becomes dropped away, for example, as by the entrance of a train into its track circuit, the dropping away of this relay applies a shunt across the line wires L1 and L2 through back contact 21 of relay 1PF, front contact 22 of relay 1FP, back contact 23 of relay 1TR, and front contact 24 of relay 1TPS. Relay 1TPS is in its picked up position at this time because of the energization of a stick circuit extending from (+), including back contact 25 of relay 1PF, connected in multiple with front contact 26 of relay 1FP and front contact 27 of relay 1TR, front contact 28 of relay 1TPS, and lower winding of relay 1TS, to (−). The circuit just described for relay 1TPS is maintained closed until the first step is taken, wherein relay 1PF is picked up prior to the picking up of relay 1FP to cause the dropping away of relay 1TPS. The dropping away of relay 1FP because of the shunt applied across the line wires L1 and L2 removes this shunt by the opening of front contact 22.

The removal of the shunt across the line wires L1 and L2 causes a decrease in the flux in the primary winding 13 (see Fig. 1A) of the impulse transformer 10 which induces a voltage in the secondary winding 30 of the impulse transformer 10 of a polarity to energize the upper winding of relay F through a rectifier 31 so as to actuate the contacts of the line relay F to their right hand positions.

Relay CS is picked up at the control office in accordance with the actuation of the line relay F by the energization of a circuit extending from (+), including back contacts 32, 33, 34, 35, 36 and 37 of relays 6V, 1V, 2V, 3V, 4V and 5V respectively, contact 38 of relay F in its right hand position, and lower winding of relay CS, to (−). The picking up of relay CS closes a shunt circuit across its upper windings through front contact 39 and resistor 40 to make this relay slow to drop away.

Upon the picking up of relay CS, the line circuit is opened at back contact 12 to insure the dropping away of all relays FP in case some of these line relays have not already been dropped away by the shunt applied across the line circuit. The picking up of relay CS causes the picking up of the stepper relays 1V to 6V successively. Relay 1V is picked up by the energization of a circuit extending from (+), including front contact 41 of relay CS, back contact 42 of relay 4V, back contact 43 of relay 2V, and upper winding of relay 1V, to (−). Upon the picking up of relay 1V, a circuit is closed for the relay 2V extending from (+), including front contact 44 of relay CS, back contact 45 of relay 5V, back contact 46 of relay 3V, front contact 47 of relay 1V, and upper winding of relay 2V, to (−). When relay 2V is picked up, a pick up circuit is closed for relay 3V extending from (+), including front contact 41 of relay CS, back contact 42 of relay 4V, front contact 43 of relay 2V, and upper winding of relay 3V, to (−). Relay 3V when picked up closes a pick up circuit for relay 4V extending from (+), including front contact 44 of relay CS, back contact 45 of relay 5V, front contact 46 of relay 3V, and upper winding of relay 4V, to (−). The picking up of relay 4V closes a pick up circuit for relay 5V extending from (+), including front contact 41 of relay CS, front contact 42 of relay 4V, and upper winding of relay 5V, to (−). Relay 5V when picked up closes a pick up circuit for relay 6V extending from (+), including front contact 44 of relay CS, front contact 45 of relay 5V, and upper winding of relay 6V, to (−).

It will be noted that the picking up of the first of the stepping relays opens a circuit that is normally closed for the energization of the oscillator CT. This circuit extends from (+), including back contacts 32, 33, 34, 35, 36 and 37 of relays 6V, 1V, 2V, 3V, 4V and 5V respectively. A second circuit has been closed, however, upon the picking up of relay CS which maintains the oscillator CT energized until the picking up of relay 6V. This circuit includes back contact 48 of relay 6V and front contact 49 of relay CS. Thus, the oscillator CT becomes deenergized when the last of the stepping relays is picked up.

In accordance with the deenergization of the oscillator CT, this oscillator starts a series of free oscillations, and a step is taken each time that the oscillator pendulum passes through a center position in its rotation to which it is biased by a torsional spring. This mode of operation is illustrated diagrammatically in the pendulum travel curve shown in the sequence charts of Figs. 3A and 3B.

Thus, when the oscillator pendulum rotates through center for the first time, the stepper relay 1V becomes dropped away. This relay is maintained energized up to this time by a stick circuit extending from (+), including contact fingers 50 and 51 of oscillator CT, front contact 52 of relay 1V, and upper winding of relay 1V, to (−). The pick up circuit that has been described for the relay 1V has been opened at back contact 43 by the picking up of relay 2V.

At this same time that the oscillator CT deenergizes the stepping relay 1V, the pole changer relay CP is picked up through the contact fingers 53 and 54 of the oscillator CT. Energy is applied through these contact fingers from front contacts 55, 56, 57, 58 and 59 of relays 1V, 2V, 3V, 4V and 6V connected in multiple. The picking up of relay CP applies energy to the lower winding of relay F with a polarity to drive the contacts of that relay to their left hand positions. Thus, the lower winding of relay F is energized through back contact 60 of relay CPP and front contact 61 of relay CP. The relay CPP is picked up in response to the picking up of relay CP upon the closure of front contact 62, but this relay is slow enough in its operation to insure the restoration of the contacts of the line relay F to their left hand positions.

As is indicated in the sequence chart of Fig. 3A, the relay CS is made slow enough in dropping away to insure that the pole changing relay CP is picked up before the relay CS is dropped away to close the line circuit at back contact 12.

Upon the dropping away of relay CS, the line circuit becomes energized with positive polarity. Thus, the line wire L1 is energized from the positive terminal of the line battery LB through back contact 12 of relay CS, primary winding 13 of the impulse transformer 10 and front contact 11 of relay CP. The line wire L2 is energized from the negative terminal of the line battery LB through front contact 14 of relay CP.

The line relay 1PF (see Fig. 1B) is connected to the line wires L1 and L2 through back contact 16 of relay 1FP, and it is connected with such a polarity as to be responsive to the positive polarity of energization of the line circuit. Thus, the relay 1PF becomes picked up, and the picking up of this relay closes a local circuit for the energization of the lower winding of relay 1FP through front contact 63. Thus, relay 1FP becomes picked up and connects the branch of the line circuit extending to station No. 2 to the line wire L1 through front contact 16.

Although the picking up of relay 1FP opens the circuit that has been described for the relay 1PF at back contact 16, the relay 1PF has its lower winding connected across the line wires L1 and L2 through front contact 16 and the rectifier 64 in a manner so that relay 1PF is held up by energization of the line circuit with a positive polarity. Similarly all of the relays PF and NF have their holding circuits polarized so that when these relays become picked up during a cycle they receive intermittent energization. This positive polarity is applied frequently enough so that these relays are maintained picked up by reason of their slow drop away characteristics provided by the shunting of the lower winding, for example, through suitable resistor and rectifier combinations. Thus, the lower winding of relay 1PF, for example, is shunted by the resistor 65 in series with the rectifier 66 so as to make the relay 1PF sufficiently slow in dropping away to be maintained picked up during the periods in the cycle when the line circuit is energized with negative polarity. A reason for this type of circuit for maintaining the relays PF and NF energized is to provide a means for releasing these relays at the end of the cycle by restoration of the negative polarity of energization of the line circuit and yet maintain the relays FP picked up.

If it is assumed that the track relay 1TR is in its dropped away position at a time when the first step of the cycle is taken, a shunt is applied to the line circuit upon the picking up of relay 1PF. This shunt is applied from the line wire L1 through front contact 21 of relay 1PF, back contact 67 of relay 1FP, and back contact 68 of relay 1TR, to line wire L2. It will be readily apparent that this shunt is only momentarily applied as the picking up of relay 1FP as a repeater of the relay 1PF opens the shunt at back contact 67. Thus, the shunt is of sufficiently short duration that the relay 1PF is maintained picked up while the shunt is applied due to its slow dropping away characteristics.

At the control office, the line relay F (see Fig. 1A) is subject to actuation during any step of the cycle to operate its contacts to their right hand positions only provided that there is a decrease in current through the primary winding 13 of the impulse transformer 10, as is the case when a shunt is removed from the line circuit during the particular step under consideration. It is, therefore, provided that if a shunt has been applied across the line wires L1 and L2 because of the track relay 1TR (see Fig. 1B) being in its dropped away position, the removal of the shunt upon the opening of back contact 67 of relay 1FP causes the actuation at the control office of the contacts of line relay F to their right hand position.

In accordance with the operation of the contacts of relay F in their right hand positions during the first step, a pick up circuit is closed for the relay OM (see Fig. 2) extending from (+), including back contact 69 of relay 1V, front contact 70 of relay 2V, contact 71 of relay F in its right hand position, and upper winding of relay OM, to (−). This relay OM, when picked up, is maintained picked up during the following even numbered step, which in this case is the second step. The stick circuit by which relay OM is energized during the second step extends from (+), including back contact 72 of relay 2V, front contact 73 of relay 3V, back contact 74 of relay CS, front contact 75 of relay OM, and lower winding of relay OM, to (−).

The stepping relay 2V (see Fig. 1A) is maintained picked up during the cycle, until the dropping away of relay 1V through front contact 76 of relay 1V and front contact 77 of relay 2V; and after the dropping away of relay 1V, relay 2V is maintained picked up through contact fingers 78 and 79 of oscillator CT, and front contact 77 of relay 2V. Thus, when the pendulum of the oscillator CT rotates through center for the second time during the cycle, the contact fingers 78 and 79 are opened and the relay 2V is dropped away to mark the beginning of the second step.

At the same time that the relay 2V is deenergized, the opening of the contact fingers 53 and 54 of the oscillator CT causes the dropping away of the pole changer relay CP, and the dropping away of this relay pole changes the line circuit through contacts 11 and 14 so as to apply a negative polarity of energization to the line wires L1 and L2. The dropping away of relay CP prior to the dropping away of its repeater relay CPP provides a pulse of energy to the lower winding of relay F through front contact 60 of relay CPP and back contact 61 of relay CP to reset the line relay F by operating its contacts to their left hand positions. It will be noted that even if the line relay F had not been operated during the first step in accordance with the track relay 1TR being in its dropped away position, the momentary opening of the line circuit by the shifting of the pulse changing contacts 11 and 14 could not have been effective to actuate the contacts of the line relay F to their right hand positions because of the energization of the lower winding with a reset polarity at this time.

Assuming that the relay OM (see Fig. 2) has been picked up during the first step, upon the dropping away of the relay 2V, a circuit is closed for the energization of the track indicator relay 1TK with a polarity to cause this relay to be picked up and thus to energize the track indicator lamp 1TE through front contact 80 to indicate that the track section associated with the track relay 1TR has become occupied by a train. The circuit by which the track indicator relay 1TK is energized with a polarity to cause this relay to be picked up extends from (B+) through front contact 81 of relay OM, back contact 82 of relay CS, front contacts 83, 84, 85 and 86 of relays 6V, 5V, 4V and 3V respectively, back contact 87 of relay 2V, and winding of relay 1TK, to (CN). Relay OM becomes dropped away upon the opening of its circuit at front contact 73 of relay 3V when the third step is taken, but the dropping away of relay OM cannot change the polarity of energization of the relay 1TK upon the shifting of contact 81 because the circuit just described for relay 1TK is also opened when the third step is taken by the opening of front contact 86. It should be readily apparent that if the track relay 1TR at field station No. 1 is in its picked up position during the first step, no shunt is applied across the line wires L1 and L2 during this step, and thus the relay OM is not picked up during the first step, and when the second step is taken, the track indicator relay 1TK becomes energized with a polarity to actuate the contacts of that relay to their dropped away positions in accordance with the polarity of energization selected by the back contact 81 of relay OM which is connected to (B−).

In accordance with the energization of the line wires L1 and L2 with negative polarity during the second step, the relay 2NF (see Fig. 1B) at field station No. 2 is picked up because it is connected to be energized only by this negative polarity of energization. Relay 2NF is energized from line wire L2 through the upper winding of relay 2NF, back contact 18 of relay 2FP and front contact 16 of relay 1FP to line wire L1. Upon the picking up of relay 2NF, relay 2FP is picked up in accordance with the closure of front contact 88 of relay 2NF, and the picking up of relay 2FP opens the circuit that has been described for relay 2NF at back contact 18 and connects in the portion of the line circuit extending to the next distant field station. Relay 2NF does not drop away, however, because of its lower winding being shunted through rectifier 89 and resistor 90 and being connected across the line wires so that the lower winding of relay 2NF is energized with positive polarity through the rectifier 91 during the positive pulses of the line circuit whereby this relay is maintained picked up until the end of the cycle.

The same circuit organization is provided for station No. 2 for the transmission of an indication of the condition of the track relay 2TR as has been described in detail for the conditions involving the indication of the condition of the track relay 1TR at field station No. 1.

If the track relay 2TR is in its dropped away position, the line relay F (see Fig. 1A) actuates the contacts to their right hand positions during the second step, and in accordance therewith the relay EM is picked up. The pick up circuit for relay EM during the second step extends from (+), including back contact 72 of relay 2V, front contact 73 of relay 3V, back contact 74 of relay CS, contact 92 of relay F in its right hand position, and upper winding of relay EM, to (−). This circuit is maintained closed until the third step is taken, at which time relay EM is maintained picked up by a stick circuit extending from (+), including back contact 93 of relay 3V, front contact 94 of relay 4V, front contact 95 of relay EM, and lower winding of relay EM, to (−).

The stepping relay 3V is dropped away when the oscillator pendulum rotates through center for the third time during the cycle in accordance with the opening of a stick circuit which has been closed through contact fingers 50 and 51 of oscillator CT, back contact 52 of relay 1V, and front contact 96 of relay 3V.

During the third step, the track indication relay 2TK becomes conditioned in accordance with whether or not a shunt has been applied during the second step across the line wires L1 and L2 by the track relay 2TR at field station No. 2. Thus, as it has been assumed that a shunt has been applied, the relay EM is in its picked up position during the third step, and the track indicator relay 2TK becomes energized with a polarity to actuate its contacts to their picked up positions. The circuit by which relay 2TK is energized under these conditions extends from (B+), including front contact 97 of relay EM, back contact 98 of relay CS, front contacts 99, 100, and 101 of relays 6V, 5V, and 4V respectively, back contact 102 of relay 3V, and winding of relay 2TK, to (CN). In case the track relay 2TR at field station No. 2 is in its picked up position during the second step, the relay 2TK becomes energized during the third step by the same circuit that has been described except that the opposite polarity of energization is applied in accordance with the closure of back contact 97 of relay EM. Relay EM becomes dropped away when the fourth step is taken by the opening of front contact 94 of relay 4V.

Relay CP (see Fig. 1A) is picked up in accordance with the closure of the contact fingers 53 and 54 of the oscillator CT when the pendulum of the oscillator rotates through center for the third time during the cycle, and the picking up of the relay CP initiates the third pulse of the line circuit which is of positive polarity. In accordance with the energization of the line wires L1 and L2 with positive polarity, relay 3PF (see Fig. 2A) becomes picked up by its connection from line wire L1 through front contact 16 of relay 1FP, front contact 18 of relay 2FP, back contact 20 of relay 3FP, and upper winding of relay 3PF, to line wire L2. This relay when picked up closes a circuit at front contact 107 to energize the lower winding of relay 3FP, and the picking up of relay 3FP extends the connection of the line circuit to the next field station, but because of the biased polar line relay at the next field station requiring a negative polarity for actuation (as is provided by the relay 2NF for field station No. 2), the relays at field station No. 4 do not become actuated until the application of the next pulse which is of negative polarity.

The closure of front contact 20 of relay 3FP provides a circuit for energization of the lower winding of relay 3PF from line wire L1 through front contacts 16, 18 and 20 of relays 1FP, 2PF and 3PF, rectifier 108, and lower winding of relay 3PF to the line wire L2. This winding is shunted by the resistor 109 connected in series with the rectifier 110, so as to make relay 3PF sufficiently slow in dropping away to be maintained picked up for the remainder of the cycle by intermittent energization with the positive pulses applied to the line wires L1 and L2.

The transmission of an indication from field station No. 3 to the control office is accomplished in the same manner as has been described for the transmission of an indication from field station No. 1 to the control office during the first step.

During the third step, the relay OM is picked up or left in its deenergized position in accordance with whether there has been a removal of shunt from the line wires to actuate the contacts of the line relay F to their right hand positions. In other words, the mode of operation during the third step in conditioning the relay OM in accordance with the indication transmitted is similar to that which has been described specifically for the conditioning of the relay OM during the first step. Thus, if the line relay F actuates its contacts to their right hand positions during the third step, the relay OM becomes picked up by the energization of a circuit extending from (+), including back contact 93 of relay 3V, front contact 94 of relay 4V, contact 71 of relay F in its right hand position, and upper winding of relay OM, to (−). This relay is maintained picked up during the fourth step by a stick circuit extending from (+), including back contact 105 of relay 4V, front contact 106 of relay 5V, back contact 74 of relay CS, front contact 75 of relay OM, and lower winding of relay OM, to (−).

The stepping relay 4V is dropped away when the pendulum of the oscillator CT rotates through center for the fourth time during the cycle in accordance with the opening of a stick circuit which has been closed through contact fingers 78 and 79 (see Fig. 1A) of oscillator CT, back contact 77 of relay 2V, and front contact 103 of relay 4V. The relay 4V has been maintained energized until the dropping away of relay 3V through front contact 104 of relay 3V and front contact 103 of relay 4V.

When the pendulum of the oscillator CT rotates through center for the fourth time the contact fingers 53 and 54 are opened and the relays CP and CPP become successively dropped away, thus providing for the application of a positive pulse to the line wires L1 and L2, and providing for the resetting of the line relay F by a mode of operation that has been described. The energization of the line wires L1 and L2 with negative polarity during the fourth step causes a mode of operation at field station No. 4 (not shown) comparable to the mode of operation specifically described as being effective at field station No. 2, the line circuit being selectively shunted or left unshunted for the transmission of an indication from that field station.

If an indication of track occupancy is transmitted during the fourth step, the line relay F has its contacts actuated to their right hand positions and thus the relay EM (see Fig. 2) becomes picked up by the energization of a circuit extending from (+), including back contact 105 of relay 4V, front contact 106 of relay 5V, back contact 74 of relay CS, contact 92 of relay F in its right hand position and upper winding of relay EM, to (−). This relay when picked up is maintained energized throughout the fifth step by a stick circuit extending from (+), including back contact 111 of relay 5V, front contact 112 of relay 6V, front contact 95 of relay EM and lower winding of relay EM, to (−).

The indication which has been received during the third step is executed during the fourth step to provide for the selective control of the track indication relays 3TK. Thus, if the relay OM has been picked up during the third step, relay 3TK is energized with a polarity to be picked up during the fourth step by a circuit extending from (B+), including front contact 81 of relay OM, back contact 82 of relay CS, front contacts 83 and 84 of relays 6V and 5V respectively, back contact 85 of relay 4V, and winding of relay 3TK, to (CN). If relay OM has not been picked up during the third step, the polarity applied to the relay 3TK during the fourth step as selected by back contact 81 of relay OM is such as to actuate the contacts of relay 3TK to their dropped away positions.

When the oscillator CT rotates through center for the fifth time during the cycle, the stepping relay 5V is dropped away by the opening of the contact fingers 50 and 51 of oscillator CT in a stick circuit for relay 5V including contact fingers 50 and 51 of oscillator CT, back contact 52 of relay 1V, back contact 96 of relay 3V, and front contact 113 of relay 5V. Relay 5V has been maintained energized up to the time the fourth step is taken by a stick circuit through front contact 114 of relay 4V and front contact 113 of relay 5V.

When the fifth step is taken, the relay CP becomes picked up upon the closure of the contact fingers 53 and 54 of oscillator CT, and in accordance with the picking up of this relay, the line circuit is pole changed so that the line wires L1 and L2 become energized with a positive polarity. Before the relay CPP can be picked up to follow the operation of relay CP, a reset circuit is set up for operating the contacts of the line relay F to their left hand positions according to a mode of operation that has been described. With the line wires L1 and L2 thus energized with positive polarity, the line circuit is extended to pick up the relay PF at the fifth field station (not shown), and an indication is transmitted to the control office of the condition of the track relay at that field station.

If the line relay F has its contacts actuated to their right hand positions during the fifth step, the relay OM (see Fig. 2) becomes picked up by the energization of a circuit extending from (+), including back contact 111 of relay 5V, front contact 112 of relay 6V, contact 71 of relay F in its right hand position, and upper winding of relay OM, to (−). Relay OM when picked up is maintained energized during the following step by a stick circuit extending from (+), including back contact 115 of relay 6V, front contact 116 of relay 2V, back contact 74 of relay CS, front contact 75 of relay OM, and lower winding of relay OM, to (−).

If the relay EM has been picked up during the fourth step in accordance with the reception of an indication, the relay 4TK becomes energized during the fifth step by a circuit extending from (B+), including front contact 97 of relay EM, back contact 98 of relay CS, front contact 99 of relay 6V, back contact 100 of relay 5V, and winding of relay 4TK, to (CN). This circuit is energized with the opposite polarity to cause the track relay 4TK to be dropped away if the back contact 97 of relay EM is closed during the fifth step.

In order that the stepping relays 1 to 5 inclusive may be used over for a second time during a cycle, beginning with the fifth step, one of these relays is picked up each time a step is taken. Thus, upon the dropping away of relay 5V at the beginning of the fifth step, the relay 1V becomes picked up by the energization of a circuit extending from (+), including front contact 32 of relay 6V, back contact 117 of relay 5V, and lower winding of relay 1V, to (—). This relay is maintained picked up by the energization of the pick up circuit just described until the sixth step is taken, and at this time, it is maintained picked up through the contact fingers 50 and 51 of oscillator CT the same as has been described when considering the initiation of the stepping.

The stepping relay 6V is maintained picked up until the dropping away of relay 5V by a stick circuit including front contact 118 of relay 5V and front contact 119 of relay 6V. When the oscillator CT operates through center for the sixth time during the cycle, the opening of the contact fingers 78 and 79 opens a stick circuit by which the relay 6V has been held. Such stick circuit extends from (+), including contact fingers 78 and 79 of oscillator CT, back contact 77 of relay 2V, back contact 103 of relay 4V, front contact 119 of relay 6V, and upper winding of relay 6V, to (—). The dropping away of relay 6V closes a pick up circuit for relay 2V extending from (+), including back contact 32 of relay 6V, front contact 33 of relay 1V, back contact 120 of relay CS, and lower winding of relay 2V, to (—). Relay 2V is maintained picked up by stick circuits that have been described until the next even numbered step is taken.

If a shunt is removed from the line wires L1 and L2 during the sixth step, the relay EM (see Fig. 2) becomes picked up by the energization of a circuit extending from (+), including back contact 115 of relay 6V, front contact 116 of relay 2V, back contact 74 of relay CS, contact 92 of relay F in its right hand position and upper winding of relay EM, to (—). This relay is maintained picked up during the seventh step by a stick circuit including back contact 69 of relay 1V, front contact 70 of relay 2V, and front contact 95 of relay EM.

If the relay OM has been picked up during the fifth step, the relay 5TK is picked up during the sixth step by the energization of a circuit extending from (B+), including front contact 81 of relay OM, back contact 82 of relay CS, back contact 83 of relay 6V, front contact 121 of relay 1V and winding of relay 5TK, to (CN). If the relay OM is in its dropped away position at this time, the relay 5TK becomes energized with the opposite polarity as applied through back contact 81 of relay OM.

When the seventh step is taken, the relay 1V (see Fig. 1A) becomes dropped away by the same mode of operation that has been described as being effective during the first step, and the dropping away of this relay opens the pick up circuit that has been described for relay 2V at front contact 33 and closes a pick up circuit for relay 3V extending from (+), including back contact 32 of relay 6V, back contact 33 of relay 1V, front contact 34 of relay 2V, and lower winding of relay 3V, to (—). Relay 3V when picked up is maintained energized by a stick circuit through front contact 122 of relay 2V and front contact 96 of relay 3V until the relay 2V is dropped away to form the eighth step. At this time the relay 3V is maintained energized by a stick circuit dependent upon the oscillator CT in the same manner as has been described when considering the initial operation of this relay to form the third step in the cycle.

During the seventh step, the relay OM (see Fig. 2) is picked up if the relay F is actuated in response to the removal of a shunt from the line wires L1 and L2, relay OM being picked up at this time by a circuit that has been described when considering energization during the first step, and it is maintained picked up by a stick circuit that has been described when considering maintaining this relay energized during the second step.

If the relay EM is in its picked up position during the seventh step, the track indicator relay 6TK becomes picked up by the energization of a circuit extending from (B+), including front contact 97 of relay EM, back contact 98 of relay CS, back contact 99 of relay 6V, front contact 123 of relay 2V, back contact 124 of relay 1V, and winding of relay 6TK, to (CN). If the relay EM is in its dropped away position during the seventh step, the relay 6TK becomes energized with the opposite polarity as selected by the closure of back contact 97 of relay EM.

The relay 2V (see Fig. 1A) becomes dropped away for the second time during the cycle to initiate the eighth step when the oscillator operates through center for the eighth time during the cycle, and in accordance with the dropping away of this relay the pick up circuit that has been described for relay 3V is opened at front contact 34, and a pick up circuit is closed for relay 4V extending from (+), including back contact 32 of relay 6V, back contact 33 of relay 1V, back contact 34 of relay 2V, front contact 35 of relay 3V, and lower winding of relay 4V, to (—). Relay 4V when picked up is maintained picked up by stick circuits that have been described until it is released by the oscillator CT for initiation of the tenth step.

The dropping away of relay 2V for the second time during the cycle, conditions a circuit that has been described for the relay EM so that this relay can be picked up if the removal of a line shunt is detected by the line relay F during the eighth step. If picked up at this time, the relay EM is maintained picked up during the following step by a stick circuit that has been described.

If the relay OM is in its picked up position during the eighth step, the relay 7TK (see Fig. 2) becomes picked up by the energization of a circuit extending from (B+), including front contact 81 of relay OM, back contact 82 of relay CS, back contact 83 of relay 6V, back contact 121 of relay 1V, front contact 125 of relay 3V, back contact 126 of relay 2V, and winding of relay 7TK, to (CN). The relay 5TK is energized with the opposite polarity if the relay OM is in its dropped away position during the eighth step so as to close back contact 81.

When the oscillator CT operates through center for the ninth time during the cycle, the relay 3V becomes dropped away, and the dropping away of this relay opens the pick up circuit that has been described for the relay 4V through front contact 35, and closes a pick up circuit for relay 5V (see Fig. 1A) extending from (+), including back contact 32 of relay 6V, back contact 33 of relay 1V, back contact 34 of relay 2V, back contact 35 of relay 3V, front contact 36 of relay 4V, and lower winding of relay 5V, to (—). Relay 5V when thus picked up is maintained picked up by stick circuits that have been described until the oscillator CT operates through center for the eleventh time during the cycle.

In accordance with the dropping away of relay 3V to form the ninth step, the relay OM (see Fig. 2) becomes picked up if the line relay F is actuated by the removal of a shunt from the line wires L1 and L2 and this relay when picked up is maintained energized during the following step by a stick circuit that has been described. If relay EM becomes picked up during the eighth step, the relay 8TK becomes picked up during the ninth step by the energization of a circuit extending from (B+), including front contact 97 of relay EM, back contact 98 of relay CS, back contact 99 of relay 6V, back contact 123 of relay 2V, front contact 127 of relay 4V, back contact 128 of relay 3V, and winding of relay 8TK, to (CN). Relay 8TK is actuated to its dropped away position by energization of the opposite polarity if back contact 97 is closed during the ninth step.

When the tenth step is taken, the relay 4V is dropped away, and the dropping away of this relay opens the pick up circuit that has been described for relay 5V through front contact 36 (see Fig. 1A). The tenth step is not used for the communication of an indication, and thus is not used to extend the line circuit to another field station, but is rather used only as an execution period to control the indication relay 9TK (see Fig. 2) in accordance with the indication that has been received during the ninth step. Thus, the relay 9K is picked up if the relay OM is in its picked up position during the tenth step by the energization of a circuit extending from (B+), including front contact 81 of relay OM, back contact 82 of relay CS, back contact 83 of relay 6V, back contact 121 of relay 1V, back contact 125 of relay 3V, front contact 129 of relay 5V, back contact 130 of relay 4V, and winding of relay 9TK, to (CN). The relay 9TK is energized with the opposite polarity during the tenth step if back contact 81 of relay OM is closed.

At the time when the oscillator CT operates through center for the tenth time during the cycle, the relay CP (see Fig. 1A) and its repeater relay CPP become successively dropped away, and thus a negative polarity is applied to the line wires L1 and L2 as is maintained during a period of rest of the system. At this time energy is removed from the holding windings of the relays PF and NF in that these windings are energized only by positive polarity, and positive polarity is no longer to be applied until the initiation of another cycle of operation of the system. Thus, with reference to the sequence chart of Fig. 3B, the relays PF and NF at the different field stations become dropped away after a time determined by the shunt of their lower windings.

Although the oscillator CT operates through center for an eleventh time, and the relay 5V becomes dropped away to form an eleventh step, this step is not used, and the pole changing relay CP (see Fig. 1A) is not actuated when the step becomes effective. This is because the relays 1V, 2V, 3V, 4V, and 6V are in their dropped away positions at the time when the eleventh step is taken, and thus there is no energy feeding from front contacts 55, 56, 57, 58 and 59 respectively for the energization of the pole changing relay CP through the contact fingers 53 and 54 of oscillator CT. This eleventh step at the control office serves principally as a timing period to provide sufficient time for the dropping away of the relays PF and NF at the different field stations so that the field and office becomes conditioned substantially simultaneously in a period of rest in order that the apparatus at all stations may be ready for initiation of another cycle of operation when a new change in the condition of a track relay TR at one of the field stations is made. The oscillator CT is energized during this clear out period when the stepping relay 5V becomes dropped away to form the eleventh step by the energization of a circuit that has been described.

If a change in the condition of a track relay takes place during a cycle, after the indication has been transmitted from the associated station, it is desirable to store the start thus manifested until the system is restored to a state of rest. It is therefore provided at station No. 1, for example, that if the track relay 1TR is dropped away before the step is taken at the associated station, relay 1TPS becomes dropped away when the step is taken; but if the track relay 1TR becomes dropped away during a cycle, after the first step is taken, the relay ITPS is maintained picked up until the end of the cycle by energization of its stick circuit through front contact 26 of relay 1FP, irrespective of the front contact 27 of the track relay 1TR being open. Thus, when relay 1PF becomes dropped away at the end of the cycle, a shunt becomes applied across the line circuit to initiate another cycle of operation of the system because of the relay 1TR being in its dropped away position, while the relay 1TPS is in its picked up position. During this new cycle, the relay 1TPS becomes dropped away when the step for the associated station is taken because of the back contact 25 of relay 1PF being opened prior to the closure of front contact 26 of relay 1FP. This puts the relays 1TR and 1TPS in correspondence so that these relays cannot initiate another cycle of operation by the application of a shunt across the line wires L1 and L2 until the relay 1TR is again picked up.

When a track relay such as relay 1TR, for example, is picked up when the system is at rest, a cycle of operation is initiated the same as when this track relay is dropped away, except that the shunt circuit is through back contact 24 of relay 1TPS and front contact 23 of track relay 1TR. There is plenty of time for this shunt to become effective because the track repeater relay 1TPS cannot be picked up until the cycle is actually initiated and relay 1FP is dropped away. At this time relay 1TPS is picked up by the energization of a circuit extending from (+), including back contact 131 of relay 1PF, back contact 132 of relay 1FP, front contact 133 of relay 1TR, and upper winding of relay 1TPS, to (−). Thus with relay 1TPS in correspondence with relay 1TR, the starting circuit is opened and no further start will be made from the field station No. 1 until the track relay 1TR becomes dropped away.

It is provided that if the relay 1TR, for example, becomes picked up during a cycle of operation after the step is taken for transmission of the indication from the associated station, the start is stored to make a start of a new cycle when the system is again restored to a state of rest. This is true because the picked up circuit for the relay 1TPS required the back contacts 131 and 132 of relays 1PF and 1FP to be closed respectively, and these contacts are always open following the step during which the indication is transmitted from the associate field station to the control office.

Having thus described specifically the method provided for the control of starts at field station No. 1, it is to be understood that the same mode of operation by similar circuit organizations is effective for each of the other field stations.

Having thus described one embodiment of a code communication system provided according to the present invention, it is to be understood that various adaptations, alterations, and modifications may be applied to the specific form shown in accordance with the requirements of practice within the spirit or scope of the present invention except as limited by the appending claims.

What I claim is:

1. A normally at rest code communication system for communicating indications from different remotely spaced field stations to a control office comprising, a line circuit connecting the control office and the field stations, a timing device at the control office, normally inactive stepping means at the control office operable when initiated step by step at a rate determined by said timing device, initiating means at each of the field stations operable when the system is at rest to act over said line circuit to automatically initiate said stepping means, circuit means at the field stations and including said line circuit operable when said stepping means is initiated to first open said line circuit at each of the field stations and then extend the continuity of the line circuit extending from the control office by one station for each step taken by said stepping means, and means for distinctively communicating between a different field station and the control office each time the line circuit is extended.

2. A normally at rest code communication system of the character described for communicating indications to a control office from different remotely spaced field stations comprising in combination, a line circuit connecting the control office and the field stations, a timing device at the control office having a torsional pendulum operable when initiated through a cycle of several free oscillations through a center position, normally inactive stepping means at the control office operable when initiated to take a step each time said pendulum passes through said center position, initiating means at each of the field stations operable when the system is at rest to act over said line circuit to automatically initiate said timing device and said stepping means, circuit means at the field stations and including said line circuit operable when said stepping means is initiated to first open said line circuit at each of the field stations and then extend the continuity of the line circuit extending from the control office by one field station for each step taken by said stepping means, and means for distinctively communicating between a different field station and the control office each time the line circuit is extended.

3. A code communication system for communicating indications from a plurality of spaced field stations to a control office comprising in combination, a line relay at each of the field stations, a line circuit normally energized with a given polarity connecting the control office and the field stations, said line circuit having said line relays normally connected thereto, normally inactive pole changing means at the control office active when initiated during a cycle of operation for successively pole changing said line circuit to form several pulses of alternate polarity, circuit means at the field stations responsive to a change in the normal condition of said line circuit to open said line circuit at the associated stations, said circuit means being effective over said line circuit to automatically initiate said pole changing means into a cycle of operation, and said circuit means being effective in response to polarized pulses received over the line circuit to extend the continuity of said line circuit station by station, one station for each pulse, from the control office to the most distant station, and means for distinctively communicating between a different field station and the control office each time the line circuit is extended.

4. A normally at rest code communication system for transmitting from different field stations to a control office comprising in combination, a line relay at each of the field stations, a single line circuit normally intact connecting the control office and the field stations, said line circuit having said line relays connected thereto in multiple, normally inactive stepping means at the control office subject to initiation over the line circuit from a field station, initiating means at each of the field stations operable when the system is at rest to act over said line circuit to automatically initiate said stepping means, circuit means at the field stations and including said line circuit operable when said stepping means is initiated to open the line circuit at each of the field stations, said circuit means being operable to put the line circuit back together geographically from the control office in sections extending between adjacent stations, one section for each step taken by said stepping means, and means for distinctively communicating between a different field station and the control office each time the line circuit is extended.

5. A code communication system of the character described for communicating indications from a plurality of spaced field stations to a control office comprising, a normally energized line circuit connecting the control office and the field stations, a timing device at the control office, normally inactive pole changing means at the control office active through a cycle of operation when initiated for successively pole changing said line circuit at a rate determined by said timing device to form several pulses of alternate polarity, circuit means at the field stations responsive to a change in the normal condition of said line circuit to open said line circuit at the associated stations, said circuit means being effective over said line circuit to automatically initiate said pole changing means into a cycle of operation, and said circuit means being effective in response to polarized pulses received over the line circuit to extend the continuity of said line circuit station by station, one station for each pulse, from the control office to the most distant station, and means for distinctively communicating between a different field station and the control office each time the line circuit is extended.

6. A code communication system for communicating indications from a plurality of spaced field stations to a control office comprising in combination, a source of energy and impulse detecting means at the control office, a pair of line wires connecting the control office and the field stations, a normally energized and a normally deenergized line relay at each of the field stations, said normally deenergized line relay being of the biased polar type, a line circuit including said source of energy and said impulse detecting means and said line wires and a front contact of said normally energized line relay at each of the field stations in series, said line circuit having said normally energized line relays connected thereto in multiple, pole changing means at the control office normally effective when the system is at rest to apply a predetermined polarity of energization to the line wires, said pole changing means being rendered active automatically upon a change in line current through said impulse detecting means to first deenergize said normally energized line relays and thereby break up the line circuit and then apply pulses of alternate polarity to the line wires, circuit means for connecting said normally deenergized line relays to the line wires successively and by alternate polarization, circuit means for energizing each of said normally energized line relays when said normally deenergized line relay for the associated field station is picked up, and means for distinctively communicating between a different field station and the control office each time the line circuit is extended.

7. A normally at rest code communication system for the communication of indications from each of several different spaced field stations to a control office comprising, a line relay at each of the field stations, a line circuit connecting the control office and the field stations normally effective to energize said line relays, said line circuit including in series front contacts of said line relays whereby the deenergization of the line circuit at the control office causes the opening of the line circuit at each of the field stations, pole changing means at the control office rendered effective automatically by a change in the condition of the line circuit to pole change said line circuit at intervals to form a predetermined number of alternately polarized pulses in said line circuit, polarity responsive means at each of the field stations effective to pick up said line relay at that station in response to energization over the line circuit provided the polarity of energization of the line circuit is different from that by which the line relay for the next field station toward the control office has been picked up, and indication transmitting means at each of the field stations operable to transmit an indication over the line circuit to the control office only at the time of the picking up of said line relay for the associated station.

8. A code communication system for communicating indications from a plurality of spaced field stations to a control office comprising in combination, a source of energy and impulse detecting means at the control office, a pair of line wires connecting the control office and the field stations, a neutral line relay and a biased polar line relay at each field station, a line circuit including said source of energy and said impulse detecting means and said line wires and a front contact of each of said neutral line relays in series, said line circuit being normally effective when the system is at rest to energize said neutral line relays in multiple, pole changing means at the control office rendered operable automatically in response to an initial impulse applied to said impulse detecting means to first open said line circuit for a time to permit the dropping away of said neutral line relays and the breaking up of said line circuit and then said pole changing means being effective to pole change the line circuit at intervals to energize the line circuit with alternate positive and negative pulses, circuit means including the connection of said biased polar relays to the line circuit with alternate polarity according to geographic location of the field stations with respect to the control office for picking up said neutral line relays when said pole changing means is active, one of said neutral line relays being picked up for each pulse formed by said pole changing means to put the line circuit back together piece by piece in a geographic order from the control office to the most distant field station, and means for distinctively communicating between a different field station and the control office each time the line circuit is extended.

9. A code communication system of the character described for communicating indications from a plurality of spaced field stations to a control office comprising, a source of energy and impulse detecting means at the control office, a pair of line wires connecting the control office and the field stations, a normally energized and a normally deenergized line relay at each of the field stations, said normally deenergized line relay being of the biased polar type, a line circuit including said source of energy and said impulse detecting means and said line wires and a front contact of said normally energized line relay at each of the field stations in series, said line circuit having said normally energized line relays connected thereto in multiple, a timing device at the control office having an oscillatory pendulum operable when initiated through a center position during a number of free oscillations, means for automatically initiating said timing device in response to said impulse detecting means, pole changing means at the control office normally effective when the system is at rest to apply a predetermined polarity of energization to the line wires, said pole changing means being actuated to pole change said line circuit when the pendulum of said oscillator passes through its center position, said pole changing means being effective initially to deenergize said normally energized line relays and thereby break up the line circuit and then apply pulses of alternate polarity to the line wires, circuit means for connecting said normally deenergized line relays to the line wires successively and by alternate polarization, circuit means for energizing each of said normally energized line relays when said normally deenergized line relay for the associated field station is picked up and thereby extend the continuity of the line circuit to the next field station and means for distinctively communicating between a different field station and the control office each time the line circuit is extended.

10. A normally at rest code communication system for transmitting from different field stations to a control office comprising, a line relay at each of the field stations, a single line circuit extending from the control office to the field stations normally energizing said line relays in multiple, normally inactive stepping means at the control office subject to initiation over the line circuit from a field station and operable through a cycle of operation when initiated, circuit means at the field stations and including said line circuit operable when said stepping means is initiated to open the line circuit at the field stations and to put the line circuit back together geographically one section for each step taken by said stepping means at the control office, and means for communicating an indication from the field stations to the control office during the respective steps, one indication being transmitted from each field station during a single cycle of operation of the stepping means.

11. A code communication system for communicating indications from each of a plurality of spaced field stations to a control office comprising, a line circuit connecting the control office and the field stations, a timing device at the control office, normally inactive pole changing means at the control office active through a cycle of operation when initiated for successively pole changing said line circuit to form several pulses of alternate polarity, circuit means at the field stations responsive to a change in the normal condition of said line circuit to open said line circuit at the associated stations, said circuit means being effective over said line circuit to initiate said pole changing means into a cycle of operation and said circuit means being effective in response to polarized pulses received over the line circuit to extend the continuity of the line circuit station by station, one station for each pulse, from the control office to the most distant station, and circuit means for communicating an indication to the control office from a different station each time that the continuity of the line circuit is extended.

12. A normally at rest code communication system for communicating indications to a control office of the conditions of devices at different remotely spaced field stations comprising, a single line circuit connecting the control office and the field stations normally energized with a given polarity, normally inactive pole changing means at the control office for successively pole changing said line circuit when rendered active for a cycle of operation to form a number of polarized pulses, circuit means at the field stations responsive to a change in the condition of any one of said devices to act over the line circuit to initiate said pole changing means at the control office into a cycle of operation, said circuit means being responsive upon the initiation of a cycle of operation to open said line circuit at each station, and said circuit means being effective during a cycle of operation in response to polarized pulses received over the line circuit to extend the continuity of said line circuit station by station, one station for each pulse, from the control office to the most distant field station, and indication transmitting means at the field stations for transmitting indications of the conditions of said devices in response to different pulses or energization of said line circuit, one indication being transmitted from each station during a cycle of operation of said pole changing means.

13. A code communication system for communicating indications to a control office of the conditions of devices at different remotely spaced field stations comprising, a single line circuit connecting the control office and the field stations, a timing device at the control office operable when initiated for a number of free oscillations of a pendulum through a center position, pole changing means at the control office for successively pole changing said line circuit to form a number of polarized pulses, said pole changing means being subject to actuation when said pendulum of said timing device is operated through said center position, circuit means at the field stations responsive to a change in the condition of any one of said devices operable over the line circuit to initiate said timing device, said circuit means being responsive upon the initiation of the timing device at the control office to open said line circuit at each of the field stations, and said circuit means being effective during a cycle of operation in response to polarized pulses received over the line circuit to extend the continuity of said line circuit from the control office by one station for each time the line circuit is pole changed, and indication communicating means effective for communicating an indication of the condition of a device at each of the field stations during a cycle of operation.

14. A normally at rest code communication system for communicating indications to a control office of conditions of devices at a plurality of remotely spaced field stations comprising in combination, a line relay at each field station, a single line circuit connecting the control office and the field stations having said line relays connected thereto in multiple, normally inactive stepping means at the control office subject to initiation over the line circuit from a field station and operable when initiated to apply a series of polarized pulses to the line circuit, initiating means at each of the field stations operable in response to a change in the condition of a device at that station to act over the line circuit to initiate said stepping means, circuit means effective in response to said initiating means for breaking the line circuit at each of the field stations, electro-responsive means at the field stations operable in response to initial energization over the line circuit from the control office by a given polarity selected by said stepping means to transmit an indication of the condition of a device at that station, said electro-responsive means being effective to put said line circuit back together by extending the line circuit from the control office one station for each step of said stepping means, and indication receiving means at the control office selectively governed by said stepping means to receive the indications from the different field stations during the different steps.

15. A code communication system for communicating indications from a plurality of spaced field stations to a control office comprising in combination, a source of energy and impulse detection means at the control office, a pair of line wires connecting the control office and the field stations, a normally energized line relay at each of the field stations, a line circuit including said source of energy and said impulse detecting means and said line wires and a contact of each of said line relays in series, said line circuit having said line relays connected thereto in multiple, circuit means at each of the field stations for selectively shunting and unshunting the line circuit, pole changing means at the control office normally effective when the system is at rest to select a given polarity of energization of the line wires, said pole changing means being rendered active in response to the initial operation of said impulse detecting means to momentarily open said line circuit and thereby break up the line circuit by the dropping away of said line relays at the different field stations, and said pole changing means being effective when rendered active to select the application of pulses of alternate polarity to the line wires for a succession of pulses comparable in number to the number of field stations, and circuit means at the field stations effective when said pole changing means is active for connecting said line relays to the line circuit successively in progression from the control office, one line relay being connected for each pulse until the line relays at all of the field stations are energized, and circuit means at each of the field stations for selectively shunting and unshunting the line circuit at the time of picking up said line relay at the associated station in accordance with the condition of a device at the associated station.

16. A normally at rest code communication system for communicating indications to a control office of conditions of devices at a plurality of remotely spaced field stations comprising, a single line circuit connecting the control office and the field stations, a timing device at the control office having an oscillatory pendulum operation for a number of free oscillations through a center position, stepping means at the control office operable to take a step each time said pendulum passes through said center position in a cycle of operation, initiating means at each of the field stations operable in response to a change in the condition of a device at that station to act over the line circuit to initiate said timing device, circuit means effective in response to said initiating means for opening the line circuit at each of the field stations, electro-responsive means at the field stations operable in response to initial energization over the line circuit from the control office by a given polarity determined by said timing device to transmit an indication of the condition of a device at that station, said electro-responsive means being effective to extend the continuity of the line circuit to the next distant station when the indication is transmitted from the associated station, and indication receiving means at the control office selectively governed by said stepping means to receive the indications from the different field stations during the different steps.

17. A normally at rest code communication system of the character described for communicating indications to a control office from a plurality of spaced field stations as to the condition of a device at each station comprising, a line circuit connecting the control office and the field stations, normally inactive pole changing means at the control office effective when rendered active to successively pole change said line circuit for a cycle of operation to form a predetermined number of polarized pulses, initiating means at the field stations responsive to a change in the condition of any one of said devices effective over the line circuit to initiate said pole changing means at the control office into a cycle of operation, said initiating means being rendered ineffective while a cycle of operation is in progress, and said initiating means being effective to store a start condition set up by a change occurring in the condition of one of said devices while a cycle of operation is in progress until the system enters a state of rest, electro-responsive means at the field stations operable in response to said initiating means to open the line circuit initially during a cycle at each of the field stations, said electro-responsive means being effective in response to polarized pulses transmitted by said pole changing means to extend the continuity of said line circuit from the control office, station by station, one station for each pulse, until the continuity of the line circuit is restored complete from a control office to the most distant field station, and means for communicating an indication to the control office of the condition of one of said devices at a station each time that the continuity of the line circuit is extended during a cycle of operation.

18. A normally at rest code communication system for communicating indications to a control office from a plurality of spaced field stations as to the condition of a device at each station comprising in combination, a normally energized line circuit connecting the control office and the field stations, normally inactive pole changing means at the control office for successively pole changing said line circuit when rendered active for a cycle of operation to form a number of polarized pulses, initiating means at the field stations responsive to a change in the condition of any one of said devices effective over the line circuit to initiate said pole changing means at the control office into a cycle of operation, said initiating means being rendered ineffective while a cycle is in progress, and said initiating means being effective to store a start condition set up by a change occurring in the condition of one of said devices while a cycle of operation is in progress until the system enters a state of rest, and electro-responsive means at the field stations operable in response to said initiating means for initially opening the line circuit at each of the field stations and then extend the continuity of the line circuit from the control office station by station, one station for each pulse transmitted by said pole changing means until the continuity of the line circuit is complete from the control office to the most distant field station.

19. In a code communication system for communicating indications from a plurality of spaced field stations to a control office, an impulse detector and a magnetic stick line relay at the control office, a single line circuit including said impulse detector connecting the control office and the field stations, pole changing means at the control office effective when rendered active to pole change said line circuit to form a number of pulses of alternate polarity during a cycle of operation, and circuit means for energizing said line relay at times with one polarity from said impulse detector and at other times with the opposite polarity in response to the actuation of said pole changing means to pole change said line circuit.

20. In a code communication system of the character described for communicating indications from at least one field station to a control office, an impulse detector and a magnetic stick line relay at the control office, a single line circuit including said impulse detector connecting the control office and the field stations, pole changing means at the control office effective when rendered active to pole change said line circuit to form a number of pulses of alternate polarity during a cycle of operation, circuit means for energizing said line relay with one polarity from said impulse detector and with the opposite polarity momentarily at the time of change in the polarity of energization of said line circuit.

21. In a code communication system for communicating indications from a plurality of spaced field stations to a control office, an impulse detector and a magnetic stick line relay having two windings, a single line circuit including said impulse detector connecting the control office and the field stations, pole changing means effective when rendered active to pole change said line circuit to form a number of pulses of alternate polarity during a cycle of operation, circuit means for energizing one of said windings of said line relay in response to said impulse detector, and circuit means for energizing the other of said windings of said line relay momentarily each time a change is made in the polarity of energization of said line circuit.

22. In a code communication system for communicating indications to a control office from a number of remotely spaced field stations, a single line circuit connecting the control office and the field stations, a timing device at the control office operable when initiated through a cycle of free oscillations of a pendulum through a center position, means for automatically initiating said timing device in response to a change in the condition of energization of said line circuit, pole changing means at the control office operable to pole change said line circuit when said pendulum operates through said center position, circuit means acting over said line circuit to open said line circuit at each of the field stations at the beginning of a cycle, said circuit means being effective to extend the continuity of the line circuit from the control office to a more distant station for each time said line circuit is pole changed during a cycle of operation, and means for communicating from a different field station to the control office each time the line circuit is extended.

23. In a code communication system of the character described, a single line circuit connecting a control office and a number of remotely spaced field stations, pole changing means at the control office operable to pole change said line circuit a number of times during a cycle of operation, circuit means acting over said line circuit to open said line circuit at each of the field stations at the beginning of a cycle of operation, said circuit means being effective to extend the continuity of the line circuit from the control office to a more distant field station for each time said line circuit is pole changed, and means for communicating from a different field station to the control office each time the line circuit is extended.

References Cited in the file of this patent

UNITED STATES PATENTS

| | | |
|---|---|---|
| 1,053,048 | Lindsey | Feb. 11, 1913 |
| 1,112,019 | McNally | Sept. 29, 1914 |
| 2,011,237 | Baughman | Aug. 13, 1935 |
| 2,073,050 | Dicke | Mar. 9, 1937 |
| 2,082,152 | Dicke | June 1, 1937 |
| 2,419,729 | Potts | Apr. 29, 1947 |